June 7, 1966 R. D. RUMSEY 3,254,885
HYDRAULIC BUFFER STRUCTURE
Filed Feb. 23, 1965 2 Sheets-Sheet 1

INVENTOR.
ROLLIN DOUGLAS RUMSEY

ATTORNEYS

INVENTOR.
ROLLIN DOUGLAS RUMSEY

ATTORNEYS

United States Patent Office 3,254,885
Patented June 7, 1966

3,254,885
HYDRAULIC BUFFER STRUCTURE
Rollin Douglas Rumsey, Buffalo, N.Y., assignor to Houdaille Industries, Inc., a corporation of Michigan
Filed Feb. 23, 1965, Ser. No. 434,532
7 Claims. (Cl. 267—1)

This invention relates to hydraulic shock absorbing buffers, and more particularly to such buffers capable of absorbing high loads under adverse environmental conditions, such as in railway car "sliding sill' construction.

The present application is a continuation-in-part of copending application Number 225,976, filed September 24, 1962, now abandoned.

In the copending application is described and claimed a heavy duty hydraulic shock absorbing buffer of great length relative to diameter. Such buffer is of high capacity in proportion to size and is adapted for use in numerous instances such as in aircraft, missiles, railway cars, and the like, where space and weight are at a premium.

An important object of the present invention is to provide a new and improved pivotal follower means in a hydraulic shock absorbing buffer of the type indicated.

A further object of the invention is to provide a new and improved head structure for a hydraulic buffer.

A still further object of the invention is to provide a new and improved means in a hydraulic buffer for mounting a working cylinder in a hydraulic buffer.

Yet another object of the invention is to provide new and improved means in a hydraulic buffer for displacement of hydraulic fluid between a working cylinder and a fluid reservoir.

Other objects, features and advantages of the present invention will be readily apparent from the following detailed description of certain preferred embodiments thereof taken in conjunction with the accompanying drawings in which.

Figure 1:
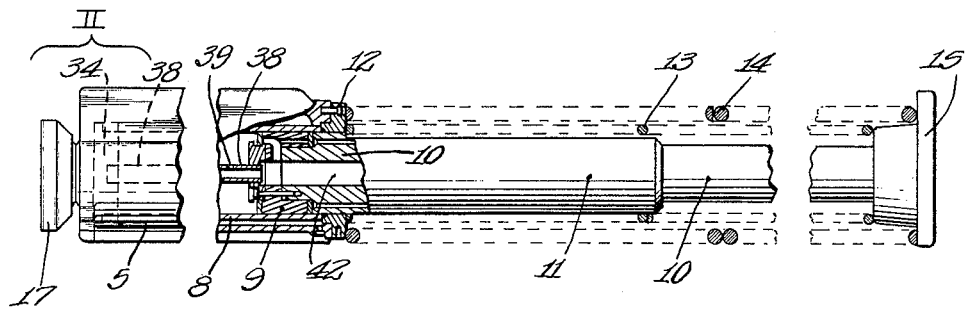
FIGURE 1 is a fragmental side elevational view, partially in section, of a hydraulic shock absorbing buffer embodying features of the invention.
Figure 2:
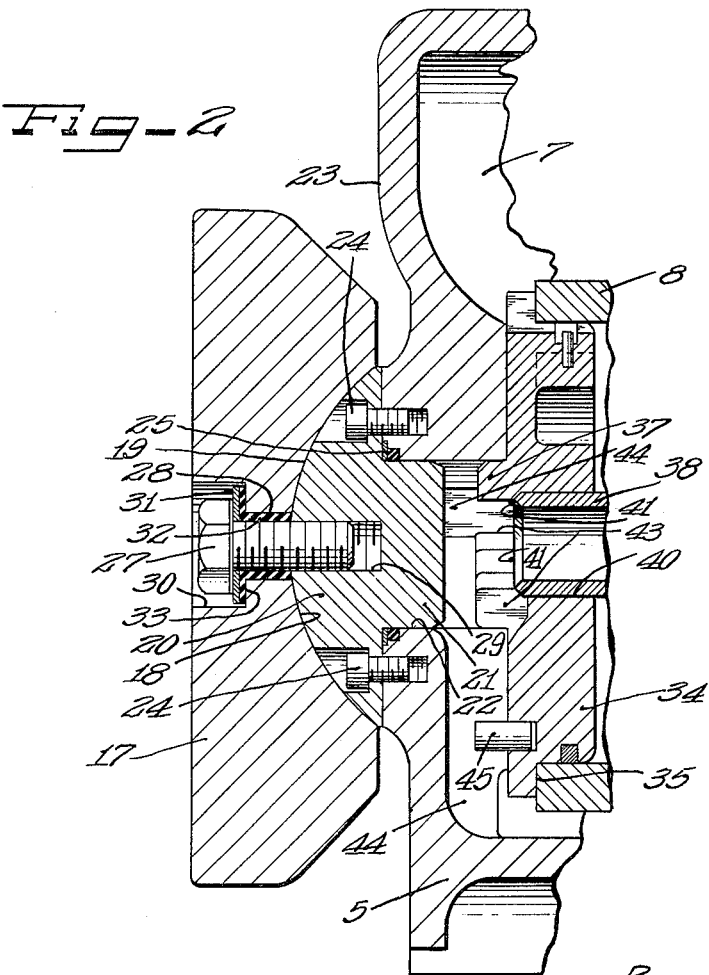
FIGURE 2 is an enlarged fragmentary longitudinal sectional view of substantially that portion of the buffer indicated by the bracket II of FIGURE 1.

A hydraulic shock absorbing buffer as depicted in FIGURES 1 and 2 is constructed and arranged for use in a substantially horizontal position and to provide for a substantial range of shock absorbing travel of the active components. To this end, the buffer includes an elongated main body or housing 5 defining therein a reservoir 7 for hydraulic fluid and having mounted longitudinally therein a working cylinder 8 within which is reciprocably slidably engaged a piston 9 having a piston rod 10 of substantial length extending through a cylinder extension 11 mounted to one end of the housing 5 by means of a bolted-on flange 12 and cooperating in mounting the adjacent end of the cylinder 8 concentrically. A normally extended position of the piston 9 and the piston rod 10 is maintained by compression springs 13 and 14 thrusting at respective opposite ends against the flange 12 and against a flanged terminal abutment member or follower 15 on the outer end of the piston rod 10 and adapted to engage against one of opposing relatively movable members movement of which is to be resisted by the buffer.

At the opposite end of the buffer unit is mounted a member 17 comprising what may be called a follower, buffer head, terminal abutment piece, or the like, and which is engageable with the other of the relatively movable members between which the buffer is adapted to be mounted and relative movement of which is to be resisted by the buffer, at least toward one another and in the course of which the buffer is contracted. Strain upon the buffer is avoided by having the follower member 17 mounted for limited though adequate universal operational swiveling relative to the housing 5, so as to compensate for misalignments and afford tolerance adjustments in respect to compression thrusts applied by the opposing members with which the buffer engages.

In a desirable construction, the follower 17 has on its inner face a central concave, generally semipherical recess providing a bearing surface 18 which thrusts in swiveling relation against a complementary semispherical convex bearing head surface 19 on a thrust head member 20. This head member has a centering stem boss 21 projecting centrally inwardly therefrom and engaged in a complementary bore 22 formed coaxially with the cylinder 8 in a head end portion 23 which, in this instance, otherwise integrally closes the adjacent end of the housing 5. Attachment of the thrust head member 20 to the head 23 is effected as by means of screws 24. Since the member 20 provides a closure plug for the bore 22, suitable fluid sealing ring means 25 are provided in the joint between the member 20 and the head 23.

Swiveling attachment of the follower 17 to the thrust member 20 is effected as by means of a bolt 27 the shank of which extends through a swivel clearance axial bore 28 in the follower member and is secured threadedly into a threaded outwardly opening blind end or central counterbore 29 in the thrust member 20. In order to countersink the head of the bolt 27 within the outer abutment face of the follower 17, a central counterbore 30 is provided in such face. The diameter of the counterbore 30 is sufficiently large to enable engagement of the head of the bolt by means of a suitable wrench such as a socket wrench. Between the head of the bolt 27 and the shoulder provided by the bottom of the counterbore 30 is interposed a thrust washer 31 and a space is maintained relative to the counterbore shoulder whereby to enable swiveling, rocking or oscillating adjustment movements of the follower member 17 relative to the thrust member 20. It will be observed that the inner end of the follower member 17 where it opposes the housing head 23 is in uniform normally spaced relation whereby to avoid interference with such adjustments of the follower member.

In order to maintain firm contact of the follower bearing surface 18 and the complementary thrust head member surface 19, as well as a normally centered relation, a resiliently yieldable rubber-like bushing 32 surrounds the shank of the bolt 27 within the bore 28 and has a lateral or head flange 33 interposed between the thrust washer 31 and the counterbore shoulder.

Mounting of the cylinder 8 concentrically within the housing 5 is effected at the head end of the assembly by means of a locating flange member 34 which provides an end closure for the cylinder and has a peripheral rabbet groove 35 within which the associated end portion of the cylinder tube is fitted. Concentric location of the flange member 34 on the inner side of the housing head portion 23 is maintained by an outwardly projecting central boss structure 37 fitted into the inner end of the bore 22 of the housing head.

During shock absorbing contracting or telescoping relative movements of the housing 5 and the piston rod 10, the piston 9 is driven from a normal position adjacent the inner or extension cylinder end of the cylinder 8 toward head end of the cylinder. During such action high shock-absorbing hydraulic pressure is developed in the working cylinder accompanied by metering of the hydraulic fluid from the cylinder into the reservoir 7. For this purpose a metering tube 38 of substantially smaller diameter than the piston 9 is fixedly mounted concentrically within the working cylinder 8, coactive with the piston, and provided with a longitudinal series of spaced metering orifices 39. Fixed mounting of the metering tube 38 is effected by securing one end portion thereof within a central bore 40 in the locating and attachment flange 34, permanence of the tube attachment being assured by means such as tack welds 41. At its free end portion, the metering tube 38 extends through a slidable bearing bore coaxially through the piston 9 and is receptive in an elongated bore 42 extending axially in the piston rod 10 to a length at least equal to that of the extent of the metering tube rearwardly from the head end attachment flange member 34.

Free and as reasonably unobstructed fluid passage between the interior of the metering tube 38 and the reservoir 7 through the anchored end of the tube is afforded by way of a plurality, herein three, relatively large cross-sectional flow area radial passage slots 43 through the centering boss structure 37 and a clearance space between the boss structure and the opposing centering boss 21. Aligned with the slots 43 are respective large aggregate cross-sectional flow area radial passage grooves 44 provided in the inner face of the end closure 23 and communicating between the bore 22 and the reservoir 7. Registration of the slots 43 with the passage grooves 44 is assured in the assembly by means such as a registration pin 45 projecting from the outer face of the attachment flange 34 and aligned within one of the passage grooves 44.

Figure 3:
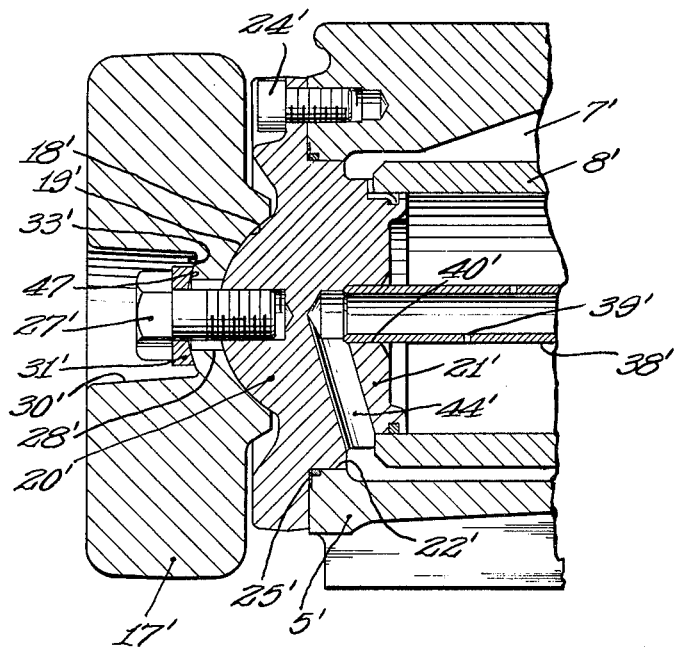
FIGURE 3 is a longitudinal sectional view similar to FIGURE 2 but showing a modification.

In the modification of FIGURE 3, a buffer structure substantially the same as that disclosed in relation to FIGURES 1 and 2 differs in that instead of separate flanged head and cylinder tube supporting members, a single member 20' serves both functions. Thus the flanged member 20' has the boss portion 21' thereof stepped for not only fitting closingly within the bore 22' of the housing but for concentrically supporting the cylinder 8' within the reservoir 7' and also supporting the metering tube 38' (which has the metering orifices 39') within the inwardly opening blind end bore 40' from which leads at least one lateral passage 44' effecting communication between the end of the metering tube and the reservoir 7'. The bolts 24' secure the flanged head member 20' in closing relation on the head end of the housing 5', with the sealing structure 25' in the joint between member 20' and the housing.

Universal rocking, pivoting, swiveling movement of the head follower member 17' on the head closure member 20' is accomplished through the complementary concave semispherical bearing surface 18' in the inner face of the follower member slidably bearingly engaging the convex complementary bearing surface 19' on the head closure member 20'. In this instance, a substantial range of swiveling, rocking movement of the follower 17' relative to the head member 20' is enabled by free clearance about the shank of the attachment screw or bolt 27' afforded by the larger diameter clearance bore centrally through the follower member 17', as well as the larger diameter of the bolt head recess 30' opening outwardly from the member 17'. Additionally, the thrust washer 31' in this embodiment against which the head of the bolt 27' engages has a semi-spherical inner bearing face parallel with the bearing surface 18' and in slidable bearing engagement with the shoulder 33' which is of complementary convex semispherical shape.

Figure 4:
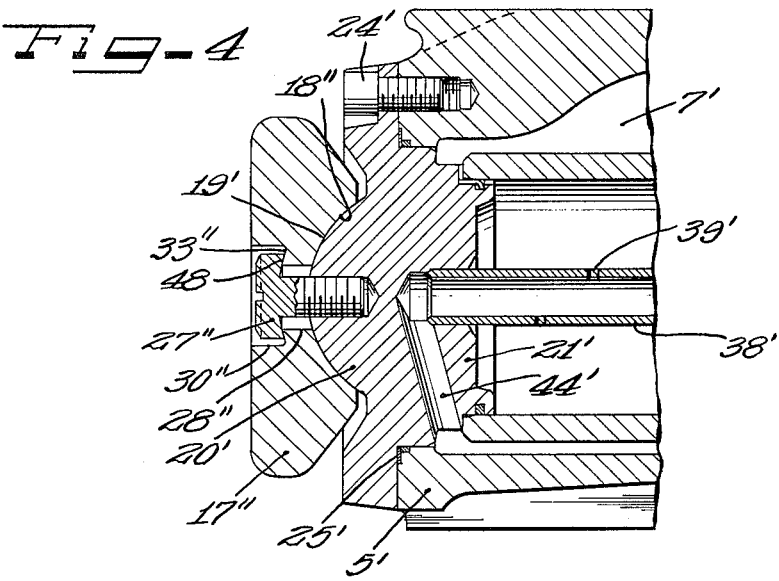
FIGURE 4 is a similar view showing another modification.

Referring now to the embodiment of FIGURE 4, details of the buffer structure are substantially the same as described with respect to the embodiment of FIGURE 3 and like primed reference numerals designate like parts and features. The principal difference resides in that the follower 17" is of a smaller size, although its concave semispherical inner face bearing surface 18" is of a radius complementary to the radius of the slidably engaged convex semispherical bearing surface 19'. Similarly, as in the previously described form, the attachment screw or bolt 27" for the abutment 17" has the shank thereof extending through a substantially larger diameter rocking clearance bore 28" and the head thereof located well within the outer face of the follower member within a clearance recess 27". In this instance, however, no intervening thrust washer is utilized between the screw head and the opposing semispherically convexly shaped thrust shoulder 33", but the screw head is provided with a complementary concavely shaped semispherical bearing surface 48 which directly slidably engages the surface 33".

It will be understood that modifications and variations may be effected without departing from the scope of the novel concepts of the present invention.

I claim as my invention:

1. In a hydraulic buffer including a housing supporting telescopically related piston and cylinder structure with a piston rod projecting from one end of the housing and having a follower thereon for engagement by one of a pair of objects between which the buffer is operable,
   a follower having a concave bearing surface,
   a thrust structure on the housing concentric with the piston and cylinder and located on the opposite end of the housing from the piston rod,
   said thrust structure having a convex bearing surface complementary to said concave bearing surface,
   the follower having a bore therethrough to said concave bearing surface,
   said thrust structure having a threaded screw hole through the convex bearing surface,
   a screw connecting the follower to said thrust structure and having a head adjacent the outer end of said bore in the follower and a shank extending through said bore in the follower and threaded into said threaded bore in the thrust structure,
   a resilient bushing having a lateral flange between said head and the follower and a bushing portion between said bore in the follower and about said shank and coacting with the screw to resiliently resist swiveling movements of the follower in engagement with a second object, and
   a thrust washer between said head and said lateral flange.

2. In a hydraulic buffer construction including a housing having a working cylinder and a piston working therein and having a piston rod projecting from one end of the housing,
   the housing having an opening in the opposite end thereof,
   a flanged plug having a boss portion in said opening and a flange portion engaging thrustingly against the outer end of said housing about said opening,
   means securing said flange portion to the housing, said plug having a convex outwardly facing bearing surface directed away from said housing, and
   a follower having a complementary concave bearing surface facing generally toward said housing and swivelly engaging said convex bearing surface.

3. A hydraulic buffer including a housing having a head portion and defining a reservoir which has an opening therefrom substantially spaced from said head portion, and comprising,
   a tubular working cylinder in said housing and extending between said head portion and said opening,
   a locating flange member assembled with one end of said working cylinder and having a central bore of substantially smaller diameter than the inside diameter of the working cylinder, a metering tube secure in said bore, means on said locating flange member and on said head portion locating the flange member on the head portion, said head portion having fluid passages beyond the adjacent ends of the working cylinder and the metering tube communicating said metering tube with said reservoir, means closing said opening and thrusting against the end of the working cylinder remote from said locating flange, a working piston slidably engaged within said working cylinder and having a bore in sliding engagement with said metering tube and whereby the piston coacts with the metering tube to effect flow of hydraulic fluid between the metering tube and the reservoir through said passages, said means on the locating flange member and the head portion comprising a centering boss on the locating flange and a complementary recess in the head portion receiving the centering boss, said passages in the head portion opening into said recess, and said centering boss extending beyond the adjacent end of the metering tube and having slots therein registering with said passages.

4. A hydraulic buffer including a housing having a head portion and defining a reservoir which has an opening therefrom substantially spaced from said head portion, and comprising, a tubular working cylinder in said housing and extending between said head portion and said opening, a locating flange member assembled with one end of said working cylinder and having a central bore of substantially smaller diameter than the inside diameter of the working cylinder, a metering tube secured in said bore, means on said locating flange member and on said head portion locating the flange member on the head portion, said head portion having fluid passages beyond the adjacent ends of the working cylinder and the metering tube communicating said metering tube with said reservoir, means closing said opening and thrusting against the end end of the working cylinder remote from said locating flange, a working piston slidably engaged within said working cylinder and having a bore in sliding engagement with said metering tube whereby the piston coacts with the metering tube to effect flow of hydraulic fluid between the metering tube and the reservoir through said passages, said means on the locating flange member and the head portion comprising a centering boss on the locating flange and a complementary recess in the head portion receiving the centering boss, said passages in the head portion opening into said recess, said centering boss extending beyond the adjacent end of the metering tube and having slots therein registering with said passages, and means on the locating flange member registering with one of said passages for assuring proper orientation of the slots and passages.

5. In a buffer construction of the character described, a housing having a head end portion, a follower member having a rear face with a recessed concave semi-spherical bearing surface therein, a complementary convex semi-spherical bearing head on said head end portion received slidably in said concave bearing surface, said member and said bearing head having respective aligned bores, said bore in said follower member having an enlarged counterbore opening from an opposite face of the follower member, a headed retaining member having a head received in said counterbore and a shank extending through the bore in said follower member and secured in the bore in said bearing head, said counterbore having a shoulder opposing said head, said counterbore being larger in diameter than said head and said follower bore being of larger diameter than said shank, a thrust washer engaging said head, a resilient spacer element interposed between said thrust washer and said shoulder, and a resilient bushing interposed between said shank and the bore in said follower member.

6. In a hydraulic buffer construction including a housing having a working cylinder and a piston working therein and having a piston rod projecting from one end of the housing, the housing having an opening in the opposite end thereof, a flanged plug having a boss portion in said opening and a flange portion engaging thrustingly against the outer end of said housing about said opening, means securing said flange portion to the housing, said plug having a convex outwardly facing bearing surface directed away from said housing, a follower having a complementary concave bearing surface facing generally toward said housing and swivelly engaging said convex bearing surface, and means connecting said follower to said plug enabling swiveling of the follower relative to the plug.

7. A construction as defined in claim 6, in which:

said follower and said plug have respective aligned bores, said bore in said follower having an enlarged counterbore opening from an opposite face of the follower from said complementary bearing surface and concentric with said bores, said connecting means comprising a headed member having a head received in said counterbore and a shank extending through the bore in said follower and secured in the bore in said plug, said counterbore having an outwardly facing shoulder presenting a semi-spherical bearing surface which is in concentric relation to said convex and concave bearing surfaces and slidably opposes a complementary concave bearing surface facing inwardly from said head, said counterbore being larger in diameter than said head and the bore of said follower being of larger diameter than said shank.

References Cited by the Examiner

UNITED STATES PATENTS

| | | | |
|---|---|---|---|
| 1,148,590 | 8/1915 | Keneval | 267—8 |
| 1,374,413 | 4/1921 | Webb | 267—8 X |
| 2,167,984 | 8/1939 | Leighton. | |
| 2,171,827 | 9/1939 | Elliott | 188—88 |
| 2,574,788 | 11/1951 | Janeway et al. | 267—9 |
| 2,739,773 | 3/1956 | Rougemont | 287—21 X |
| 2,933,309 | 4/1960 | Heiss | 267—64 |
| 3,024,875 | 3/1962 | Stultz | 267—64 X |
| 3,081,114 | 3/1963 | Esty | 287—21 X |
| 3,111,201 | 11/1963 | Bliven et al. | 267—8 X |

ARTHUR L. LA POINT, *Primary Examiner.*

W. B. WILBER, *Assistant Examiner.*